United States Patent
Otomo et al.

(10) Patent No.: US 9,523,620 B2
(45) Date of Patent: Dec. 20, 2016

(54) TWO-PHASE STAINLESS STEEL, METHOD OF MANUFACTURING THE SAME, AND DIAPHRAGM, PRESSURE SENSOR, AND DIAPHRAGM VALVE USING TWO-PHASE STAINLESS STEEL

(71) Applicant: Seiko Instruments Inc., Chiba-shi, Chiba (JP)

(72) Inventors: Takuma Otomo, Chiba (JP); Keita Naito, Chiba (JP); Ryo Sugawara, Chiba (JP); Tomoo Kobayashi, Chiba (JP)

(73) Assignee: SEIKO INSTRUMENTS INC., Mihama-Ku, Chiba-Shi, Chiba (JP)

( * ) Notice: Subject to any disclaimer, the term of this patent is extended or adjusted under 35 U.S.C. 154(b) by 123 days.

(21) Appl. No.: 14/162,247

(22) Filed: Jan. 23, 2014

(65) Prior Publication Data
US 2014/0209220 A1  Jul. 31, 2014

(30) Foreign Application Priority Data
Jan. 25, 2013  (JP) ................................. 2013-012373

(51) Int. Cl.
*C22C 38/00*  (2006.01)
*C22C 38/44*  (2006.01)
(Continued)

(52) U.S. Cl.
CPC ................. *G01L 19/00* (2013.01); *C21D 1/18* (2013.01); *C21D 1/25* (2013.01); *C21D 6/004* (2013.01);
(Continued)

(58) Field of Classification Search
CPC ............. C21D 6/004; C21D 1/18; C21D 1/25; C22C 38/001; C22C 38/004; C22C 38/44
(Continued)

(56) References Cited

U.S. PATENT DOCUMENTS 6,116,092 A * 9/2000 Ohmi ................... G01L 19/0084
73/715
7,150,198 B2 * 12/2006 Kaneko et al. ................. 73/756
(Continued)

FOREIGN PATENT DOCUMENTS

EP  0 576 802 A1  1/1994
EP  0 659 896 A1  6/1995
(Continued)

OTHER PUBLICATIONS

Extended European Search Report in corresponding European Application No. 13198022.9, dated Jun. 3, 2014, 10 pages.

*Primary Examiner* — Jessee Roe
*Assistant Examiner* — John Hevey
(74) *Attorney, Agent, or Firm* — Brinks Gilson & Lione; G. Peter Nichols

(57) ABSTRACT

It is an object of the present invention to provide a metal diaphragm capable of achieving a higher strength, excellent corrosion resistance, and a smooth surface condition, and a pressure sensor including the diaphragm. The diaphragm according to the present invention includes a two-phase stainless steel having a composition of 24 to 26 mass % Cr, 2.5 to 3.5 mass % Mo, 5.5 to 7.5 mass % Ni, 0.03 mass % or less C, 0.08 to 0.3 mass % N, and the balance Fe and inevitable impurities, and having a 0.2% proof stress of 1300 MPa or higher.

7 Claims, 15 Drawing Sheets

(51) Int. Cl.
  *C21D 6/00* (2006.01)
  *C21D 1/18* (2006.01)
  *C21D 1/25* (2006.01)
  *C22C 38/02* (2006.01)
  *C22C 38/04* (2006.01)
  *G01L 19/00* (2006.01)
  *C21D 9/00* (2006.01)

(52) U.S. Cl.
  CPC ........... *C22C 38/001* (2013.01); *C22C 38/004* (2013.01); *C22C 38/02* (2013.01); *C22C 38/04* (2013.01); *C22C 38/44* (2013.01); *C21D 9/0068* (2013.01); *C21D 2211/001* (2013.01); *C21D 2211/005* (2013.01)

(58) Field of Classification Search
  USPC .................................................. 148/608, 326
  See application file for complete search history.

(56) References Cited

U.S. PATENT DOCUMENTS

| | | | | |
|---|---|---|---|---|
| 8,293,037 | B2* | 10/2012 | Suwabe | B21C 23/085 148/506 |
| 8,333,851 | B2 | 12/2012 | Suwabe | |
| 2006/0034724 | A1* | 2/2006 | Hamano et al. | 420/39 |

FOREIGN PATENT DOCUMENTS

| | | |
|---|---|---|
| EP | 0 757 196 A1 | 2/1997 |
| EP | 2 199 421 A1 | 6/2010 |
| JP | 58-148437 A | 9/1983 |
| JP | 62-291533 A | 12/1987 |
| JP | 01-173846 A | 7/1989 |
| JP | 05-013782 A | 1/1993 |
| JP | 2000-275128 A | 10/2000 |
| WO | WO 2007/058611 A1 | 5/2007 |
| WO | WO 2008/088282 A1 | 7/2008 |
| WO | WO 2009/014001 A1 | 1/2009 |

* cited by examiner

TWO-PHASE STAINLESS STEEL, METHOD OF MANUFACTURING THE SAME, AND DIAPHRAGM, PRESSURE SENSOR, AND DIAPHRAGM VALVE USING TWO-PHASE STAINLESS STEEL

RELATED APPLICATIONS

This application claims priority under 35 U.S.C. §119 to Japanese Patent Application No. 2013-012373 filed on Jan. 25, 2013, the entire content of which is hereby incorporated by reference.

BACKGROUND OF THE INVENTION

1. Field of the Invention

The present invention relates to a two-phase stainless steel, a method of manufacturing the same, a diaphragm using the two-phase stainless steel, a pressure sensor including the diaphragm, and a diaphragm valve including the diaphragm.

2. Description of the Related Art

A metal diaphragm is a portion of a pressure sensor that is in contact with liquid and is made of an alloy material having excellent corrosion resistance and excellent pressure resistance. Since the metal diaphragm is actually used in a variety of environments, the material thereof needs to be determined in view of the use environments including the liquid properties, pressure, temperature and the like of a process fluid.

Conventionally used materials of the metal diaphragm include a Co based alloy, a Ni based alloy, and a precipitation-hardened stainless steel.

For example, a known diaphragm is made of a metal material provided by performing heat treatment on a solid solution of metal material including a Fe—Ni based alloy or a Fe—Ni—Co based alloy mixed with a precipitation-strengthened element such as Ti, Al, or Nb and performing aging-effect treatment to increase the strength (see JP-A-2000-275128 (Patent Literature 1)).

A known metallic diaphragm in a pressure sensor is made of an alloy composed mainly of 20 to 40% Cr+Mo, 20 to 50% Ni, and 25 to 45% Co, and is provided by performing cold working of 20% or higher and then heat treatment at 400 to 600° C. (see JP-A-5-013782 (Patent Literature 2)).

A disclosed method of manufacturing a thin-film sensor includes, in a thin-film pressure sensor using a metal diaphragm, performing the precipitation-strengthening of the metal diaphragm and the step of forming the thin-film pressure sensor at the same time (see JP-A-1-173846 (Patent Literature 3)).

A known pressure detector is configured by bonding a plate glass to a diaphragm face of a pressure-receiving metal diaphragm made of a Kovar material through a low-melting glass layer, placing a strain gauge semiconductor chip on the plate glass, and anodic-bonding the plate glass to the semiconductor chip (see JP-A-62-291533 (Patent Literature 4)).

A known semiconductor pressure sensor is provided by forming a fixed header from a Fe—Ni based alloy having a composition of 36 to 40% Ni by weight and the balance Fe, providing an external pressure introducing tube in a central portion of the fixed header, attaching a stem body, and including a semiconductor pressure sensor element mounted on the fixed header (see JP-A-58-148437 (Patent Literature 5)).

The alloys forming the metal diaphragm in the related arts contain Cr added thereto, and a passivation film made of a dense chromium oxide layer is formed on the surface of the alloy to have excellent corrosion resistance. Although a Ti alloy may be used as the material of the metal diaphragm, the Ti alloy provides excellent corrosion resistance since Ti having a high affinity for oxygen forms a titanium oxide layer on the surface.

A mechanical property required of the metal diaphragm is a high proof stress. The principle of the pressure sensor using the metal diaphragm is based on electrically sensing the amount of deformation of the metal diaphragm through a strain gauge provided at the metal diaphragm when a force is applied by a process fluid. Thus, the reproducibility of the pressure measurement is ensured when the metal diaphragm is elastically deformed. If a stress more than the proof stress is applied by the process fluid, the metal diaphragm is plastically deformed and cannot show a proper pressure value after the plastic deformation. To maintain the accurate pressure sensing performance, the metal diaphragm needs to have a proof stress higher than the stress applied by the process fluid.

To add the strain detecting function in the metal diaphragm, the following two structures are generally employed. The first structure includes a strain gauge bonded to the surface of the metal diaphragm opposite to the liquid contact surface, and the second structure involves using the metal diaphragm itself as a strain element. Both structures require the smoothing of the surface of the metal diaphragm in order to achieve favorable accuracy in strain sensing. For this reason, the surface of the diaphragm is finished into a smooth surface by performing various polishing steps thereon.

Thus, it is important to evaluate and select an advantageous material for the pressure sensor with excellent corrosion resistance and excellent pressure resistance in view of the use environments and the manufacture considerations in assembly of the pressure sensor.

Many of alloys containing a sufficient amount of Cr exhibit excellent corrosion resistance since a dense passivation film of chromium oxide is formed under a certain oxidizing environment. However, under a non-oxidizing environment in which a passivation film is hardly formed or under a strongly oxidizing environment in which a passivation film is further oxidized, the passivation film is broken to expose and dissolve an underlying layer. Examples of such a non-oxidizing environment include an alkaline solution and a neutral solution at high temperature. The strongly oxidizing environment may include the use of an electrochemical anti-corrosive technique to cause interference which results in unintentional application of an anode potential. The metal diaphragm may be placed in any of these environments, and to offer the material suitable for these environments is a technological challenge.

The proof stress of the Co—Ni based alloy conventionally used widely as the material of the metal diaphragm can be increased through some treatment to approximately 1500 to 1600 MPa to achieve a higher strength. However, the same mechanical property cannot be provided by another alloy, for example, an austenitic stainless steel, a ferrite stainless steel, or a Ti alloy.

For the metal diaphragm made of the precipitation-hardened alloy, the polishing of the surface of the metal diaphragm involves predominant polishing of a soft base phase to cause the protrusion or removal of a hard phase, thereby preventing the production of a favorable smooth condition. This presents the problem in which the orderly pattern of the strain gauge formed on the surface of the metal diaphragm is lost to reduce the accuracy in pressure sensing. In addition, for the metal diaphragm made of the precipitation-hardened alloy, a precipitated phase may be removed under a corrosive environment to form a pit, and the pit may serve as a starting point which may grow into a break.

The Ti alloy forming the metal diaphragm is prone to flaws and is damaged due to a slight contact after the polishing finish, so that there is a need to develop a better material for the metal diaphragm.

The present invention has been made in view of the situations in the related art, and it is an object thereof to provide a two-phase stainless steel, a method of manufacturing the same, a metal diaphragm using the two-phase stainless steel, and a pressure sensor including the diaphragm, capable of achieving a higher strength, excellent corrosion resistance, and a smooth surface condition. It is another object of the present invention to provide a diaphragm valve including the diaphragm.

SUMMARY OF THE INVENTION

To solve the problems described above, the present invention provides a two-phase stainless steel having a composition of 24 to 26 mass % Cr, 2.5 to 3.5 mass % Mo, 5.5 to 7.5 mass % Ni, 0.03 mass % or less C, 0.08 to 0.3 mass % N, and the balance Fe and inevitable impurities, and having a 0.2% proof stress of 1300 MPa or higher.

In the present invention, the two-phase stainless steel as described above may be subjected to plastic working at a reduction of area of 50% or higher, subjected to aging heat treatment at a temperature of 500° C. or lower to provide a 0.2% proof stress of 1300 MPa or higher, undergo no brittle fracture in which a fracture occurs immediately after completion of elastic deformation in a tension test, and have a fracture elongation of 6% or higher.

In the present invention, the two-phase stainless steel as described above may be subjected to plastic working at a reduction of area of 83% or higher, subjected to aging heat treatment at a temperature of 500° C. or lower to provide a 0.2% proof stress of 1500 MPa or higher, undergo no brittle fracture in which a fracture occurs immediately after completion of elastic deformation in a tension test, and have a fracture elongation of 6% or higher.

In the present invention, the aging heat treatment may be performed at a temperature from 350° C. to 500° C.

The present invention relates to the two-phase stainless steel as described above, wherein a transpassive potential in a phosphoric acid solution at a concentration of 0.2 mol/l is 1.2 V (v.sRHE) or higher.

The present invention relates to a metal diaphragm including the two-phase stainless steel as described above.

The present invention relates to a pressure sensor including the diaphragm as described above.

The present invention relates to a diaphragm valve including the diaphragm as described above.

The present invention provides a method of manufacturing a two-phase stainless steel, including performing working at a reduction of area of 50% or higher on a two-phase stainless steel having a composition of 24 to 26 mass % Cr, 2.5 to 3.5 mass % Mo, 5.5 to 7.5 mass % Ni, 0.03 mass % or less C, 0.08 to 0.3 mass % N, and the balance Fe and inevitable impurities, and performing aging heat treatment at a temperature of 500° C. or lower to provide a 0.2% proof stress of 1300 MPa or higher.

The present invention provides a method of manufacturing a two-phase stainless steel comprising performing working at a reduction of area of 83% or higher on a two-phase stainless steel having a composition of 24 to 26 mass % Cr, 2.5 to 3.5 mass % Mo, 5.5 to 7.5 mass % Ni, 0.03 mass % or less C, 0.08 to 0.3 mass % N, and the balance Fe and inevitable impurities, and performing aging heat treatment at a temperature of 500° C. or lower to provide a 0.2% proof stress of 1500 MPa or higher.

In the present invention, the aging heat treatment can be performed at a temperature from 350° C. to 500° C.

According to the present invention, the two-phase stainless steel capable of achieving a higher strength, excellent corrosion resistance, and a smooth surface condition, and the diaphragm including the two-phase stainless steel can be provided. The present invention can provide the pressure sensor including the diaphragm. The present invention can provide the diaphragm valve including the diaphragm.

According to the present invention, the two-phase stainless steel capable of achieving a higher strength, excellent corrosion resistance, and a smooth surface condition can be manufactured through the aging heat treatment.

BRIEF DESCRIPTION OF THE DRAWINGS

FIGS. 9A and 9B show the tensile fracture surface of the sample of two-phase stainless steel worked under the optimized conditions, wherein FIG. 9A shows the overall fracture surface and FIG. 9B shows an enlarged central portion of the fracture surface.

DETAILED DESCRIPTION OF THE PREFERRED EMBODIMENTS

Description will hereinafter be made of an embodiment of a diaphragm made of a two-phase stainless steel and an embodiment of a pressure sensor including the diaphragm according to the present invention.

Figure 1:
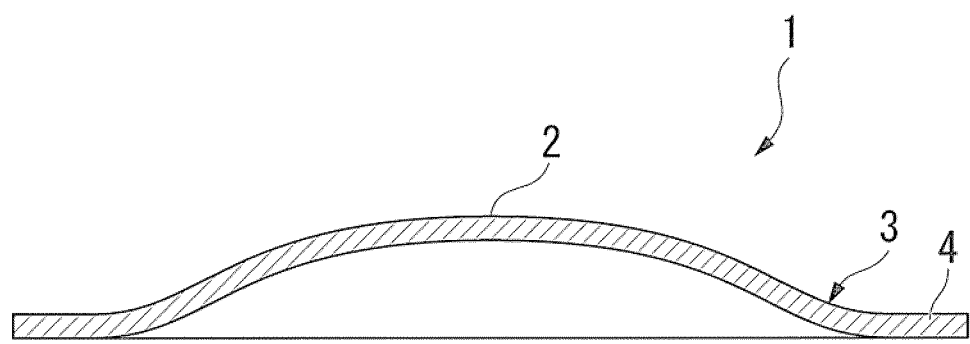
FIG. 1 is a schematic section view showing a first embodiment of a diaphragm made of a two-phase stainless steel according to the present invention.
Figure 2:
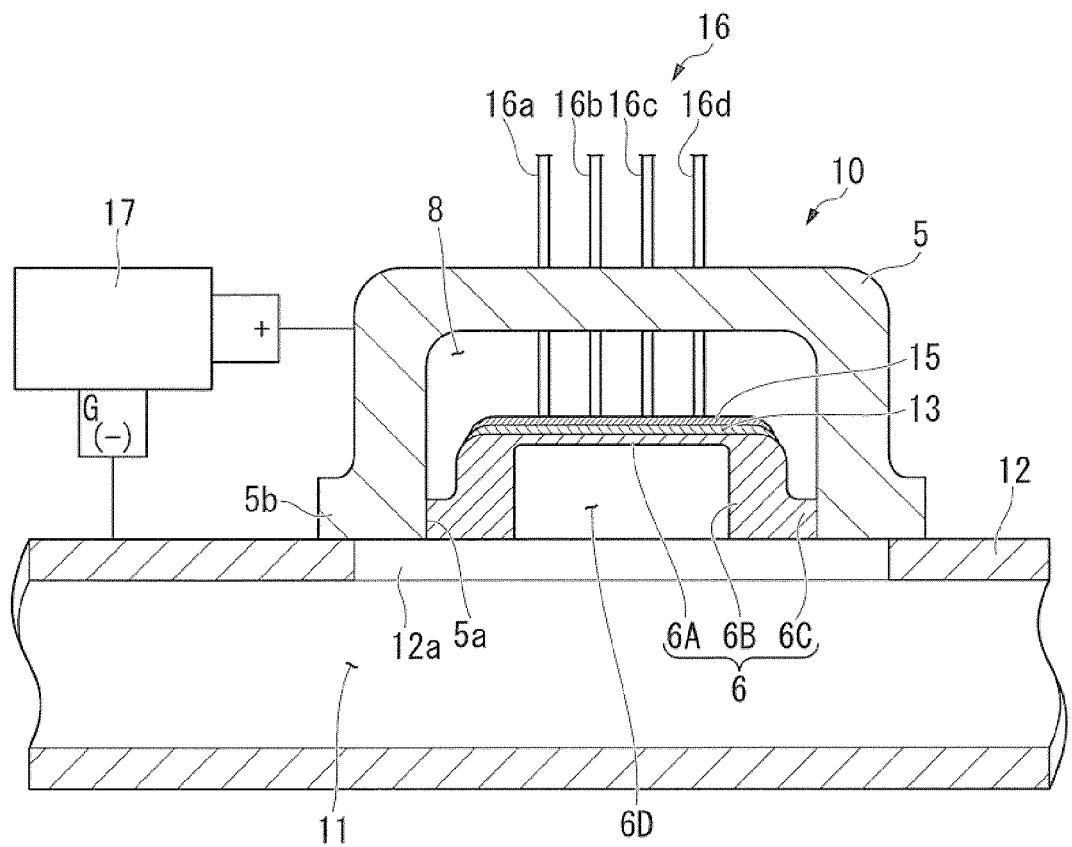
FIG. 2 is a schematic section view showing an embodiment of a pressure sensor including the diaphragm according to the present invention.

A diaphragm 1 of the present embodiment employs, as one form, a structure having a dome portion 2 of partially spherical shape (dome shape) with a radius of curvature bulging upward in the center, a boundary portion 3, and a collar portion 4 continuously formed on the periphery of the dome portion 2 with the boundary portion 3 interposed therebetween. The diaphragm 1 of this form is housed in a casing or the like, not shown, attached to piping or the like, and deformed in response to the pressure of a fluid flowing through the piping for use in measuring the fluid pressure or the like. FIG. 2 shows an exemplary application of such a diaphragm to a pressure sensor.

Figure 3:
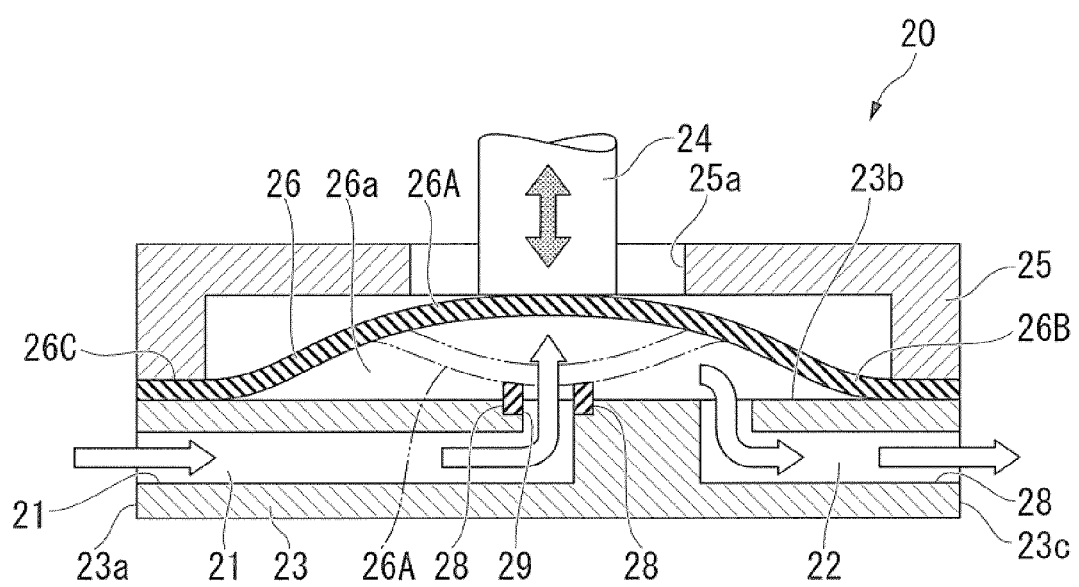
FIG. 3 is a schematic section view showing an embodiment of a diaphragm valve including the diaphragm according to the present invention.
Figure 4A:
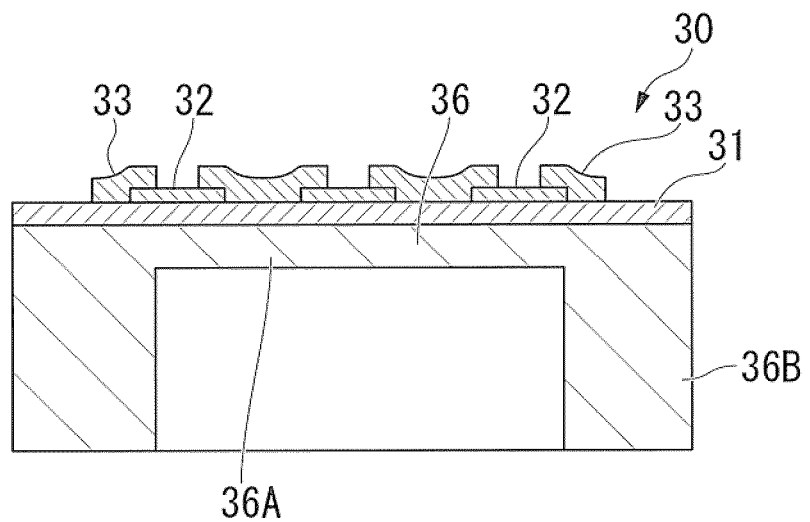
FIG. 4A is a schematic section view and FIG. 4B is a top view showing another embodiment of the pressure sensor including the diaphragm according to the present invention.
Figure 4B:
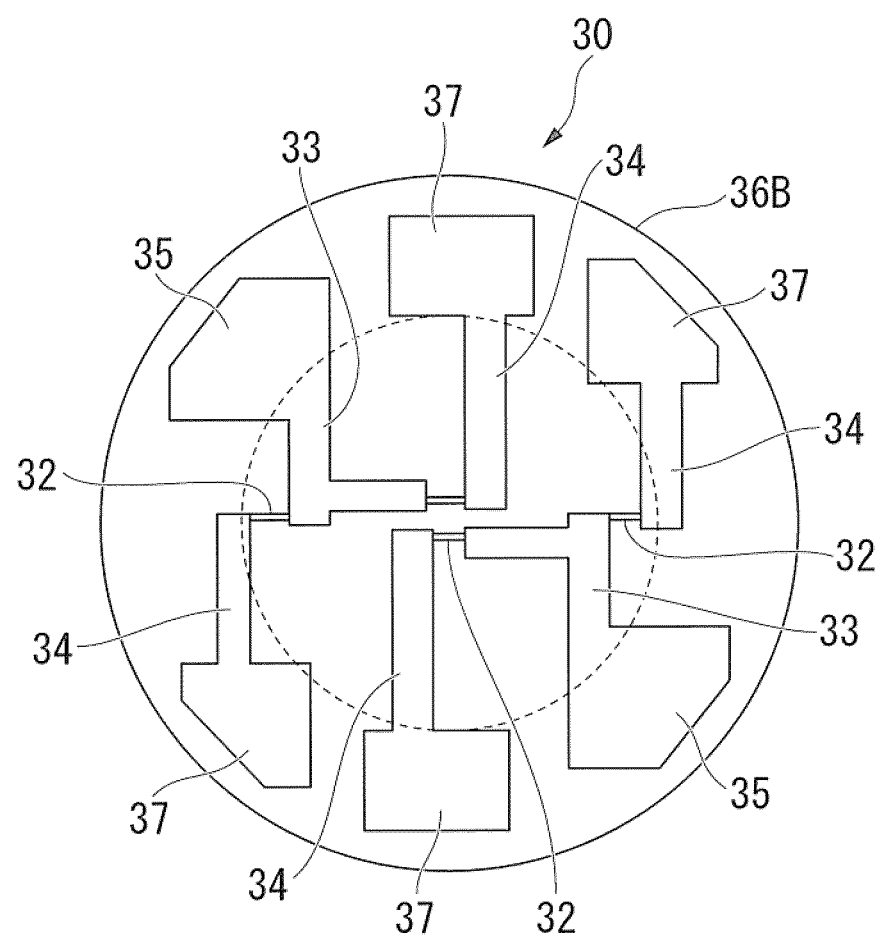

The diaphragm is housed in a casing or the like, not shown, for use in a diaphragm valve which opens or closes a flow path within the casing. FIG. 3 shows an exemplary application of the diaphragm to the diaphragm valve. In addition, a strain gauge can be formed over the diaphragm with an insulating layer interposed therebetween for use in a pressure sensor. FIGS. 4A and 4B show an exemplary application of the diaphragm to the pressure sensor including the strain gauge.

The applications of the diaphragm are not limited thereto and various uses are conceivable. In any case, the diaphragm is made of a two-phase stainless steel, as later described, and has the characteristics of accomplishing a higher strength, excellent corrosive resistance, and a smooth surface condition.

A two-phase stainless steel usable in forming the diaphragm 1 has a composition of 24 to 26 mass % Cr, 2.5 to 3.5 mass % Mo, 5.5 to 7.5 mass % Ni, 0.03 mass % or less C, 0.08 to 0.3 mass % N, and the balance Fe and inevitable impurities.

The range of the component content described in the present embodiment includes the upper limit and the lower limit unless otherwise specified. Thus, 24 to 26 mass % Cr means that Cr is contained 24 mass % or more and 26 mass % or less.

The two-phase stainless steel forming the diaphragm 1 includes a two-phase structure of an austenite phase and a ferrite phase in close proportions and has the composition ratios described above. However, the proportions of the austenite phase and the ferrite phase do not need to be the same, and it is only required that the two phases should coexist in the structure. The reason why each component is limited is described below.

Cr (chromium): Cr is needed to form a stable passivation film necessary for protection from atmospheric corrosion. Although 20 mass % or more Cr is required in the two-phase stainless steel, approximately 24 to 26 mass % Cr is required to achieve the objects in the diaphragm 1 of the present embodiment.

Mo (molybdenum): Mo assists Cr in providing pitting resistance for the stainless steel. Approximately 2.5 to 3.5 mass % Mo can be contained in the stainless steel containing Cr in the above range to improve resistance to pitting and crevice corrosion as compared with the case where only Cr is contained.

N (nitrogen): N increases corrosion resistance and crevice corrosion resistance of the two-phase stainless steel. In addition, N is an effective solid solution strengthening element contributing to improving the strength of the two-phase stainless steel. Since N also contributes to improving toughness, 0.08 to 0.3 mass % N is preferably contained.

Ni (nickel): Ni is needed to promote the change of the crystal structure of the stainless steel from body-centered cube (ferrite) to face-centered cube (austenite), to contribute to stabilizing the austenite phase, and to ensure workability. Thus, 5.5 to 7.5 mass % Ni is preferably contained.

C (carbon): Carbon is preferably contained in low amount to suppress the production of carbide responsible for brittleness. Thus, the content of C is set to 0.03 mass % or less. Since C bound to Cr present in the structure causes grain boundary corrosion, a small amount of C is preferred.

The two-phase stainless steel having the composition rates described above shows a transpassive potential of 1.2 V (v.sRHE) or higher in a phosphoric acid solution at a concentration of 0.2 mol/l. Due to the transpassive potential higher than that of the conventionally known Co—Ni based alloy, the stainless steel provides the characteristic in which uniform corrosion is less likely to occur in a non-oxidizing acid solution as compared with the Co—Ni based alloy.

The two-phase stainless steel having the composition rates described above is smelted from the molten alloy of the composition described above and is worked from a cast rod into an intended shape such as a disk or a dome with a routine procedure such as casting, hot rolling, cold rolling, or swaging, thereby providing the diaphragm.

To achieve the objects of the present embodiment, cold working, for example cold swaging, is performed at a reduction of area of 50% or higher, more preferably 57.8% or higher, more preferably 62% or higher, and most preferably 83% or higher. Then, heat treatment is performed at a temperature of 300 to 500° C. for age-hardening. The reduction of area of 50% or higher and the heat treatment at the temperature of 300 to 500° C. for age-hardening to harden the two-phase stainless steel can provide a 0.2% proof stress of as high as 1300 MPa to 1700 MPa and excellent corrosion resistance. When the two-phase stainless steel is worked as described above into the diaphragm shape before the aging heat treatment, the resulting diaphragm can have a 0.2% proof stress of as high as 1300 MPa to 1700 MPa and excellent corrosion resistance.

The age-hardening of the two-phase stainless steel has not been known conventionally and is the phenomenon found by the present inventor in the present invention. When the two-phase stainless steel having the above composition rates is subjected to the heat treatment at a temperature of more than 500° C., for example 650° C. for aging, the proof stress and the tensile strength are increased but fracture elongation is not provided and a brittle fracture is found in a tension test immediately after the completion of elastic deformation. In addition, when the heat treatment temperature is as low as approximately 200° C., the age-hardening occurs at a lower rate, and the hardening is lower than that at room temperature depending on the conditions of the reduction of area.

As a result, the heat treatment temperature preferably ranges from 300 to 500° C., and more preferably from 350 to 500° C. The aging heat treatment effectively functions to produce the two-phase stainless steel with a proof stress of 1500 MPa or higher.

FIG. 2 shows the structure of an embodiment to which the diaphragm made of the two-phase stainless steel described above is applied to the pressure sensor.

A pressure sensor 10 shown in FIG. 2 includes a cap member 5 having an inlet path for introducing a fluid of which the pressure is to be measured, and a diaphragm 6 inside and integral with the cap member 5. The diaphragm 6 is formed of a thin pressure-receiving portion 6A, a tubular portion 6B extending to surround the outer edge of the pressure-receiving portion 6A, and a collar portion 6C formed on the outer periphery of the tubular portion 6B, and the internal space of the tubular portion 6B is defined as a pressure chamber 6D.

The cap member 5 is shaped in a cap having an opening portion 5*a* and has a flange portion 5*b* on the outer periphery of the opening portion 5*a*. The inner periphery of the opening portion 5*a* is bonded to the collar portion 6C of the diaphragm 6. The cap member 5 is made, for example, of a metal material or a composite material including metal and resin. A reference pressure chamber 8 is formed inside the cap member 5 to be defined by the cap member 5 and the diaphragm 6. The cap member 5 has an inlet port (not shown) formed therein for introducing a reference gas. The reference gas is introduced through the inlet port to control the internal pressure of the reference pressure chamber 8.

As shown in FIG. 2, the pressure sensor 10 is attached to piping 12 providing a flow path 11 for an object to be measured, around an opening 12*a* formed in the peripheral wall of the piping 12. When the fluid within the piping 12 is introduced to the pressure chamber 6D of the diaphragm 6, the pressure-receiving portion 6A can be deformed in response to the pressure of the fluid.

The side of the pressure-receiving portion 6A of the diaphragm 6 closer to the reference pressure chamber 8 is worked into a smooth surface, for example a mirror surface, on which an insulating film 13 made of a silicon oxide film or the like and a bridge circuit 15 are formed. The bridge circuit 15 is formed of four strain gauges, not shown. The strain gauges are connected to wiring 16 including connector wires 16*a*, 16*b*, 16*c*, and 16*d*.

When the reference gas is introduced into the reference pressure chamber 8 and the fluid pressure of the piping 12 is applied to the pressure chamber 6D, the pressure-receiving portion 6A of the diaphragm 6 is deformed to change the resistances of the four strain gauges, thus allowing the measurement of the resistance change with the bridge circuit 15. The measurement result can be computed to detect the pressure of the pressure chamber 6D. However, the pressure-receiving portion 6A is thin and directly subjected to the pressure of the fluid, so that the metal material forming the pressure-receiving portion 6A of the diaphragm 6 needs to have a high strength and excellent corrosion resistance.

When the piping 12 is used in the field of food and drug, for example, a non-oxidizing acid cleaner may be used in order to maintain the hygienic conditions of the piping 12. When cathodic protection is used in which a particular potential is applied to the piping 12 to take a countermeasure to prevent the corrosion of such piping, a power source 17 is connected to the pressure sensor 10 and the piping 12. The ground (cathode) of the power source 17 is connected to the piping 12 and the anode is connected to the cap member 5 of the pressure sensor 10, and the potential difference is applied between them.

While such a potential difference can provide the cathodic protection for the piping 12, the diaphragm 6 is polarized toward the anode to produce the tendency to predominantly corrode the thin pressure-receiving portion 6A of the diaphragm 6 depending on the conditions. In the above case, the pressure-receiving portion 6A of the diaphragm 6 also needs to have favorable corrosion resistance.

As described above, the metal material forming the pressure-receiving portion 6A of the diaphragm 6 requiring the high strength and excellent corrosion resistance under a corrosive environment in which the cathodic protection is applied is preferably the two-phase stainless steel with high strength and high corrosion resistance having the above composition and subjected to the aging heat treatment. The diaphragm 6 formed of the above two-phase stainless steel and subjected to the aging heat treatment can have a 0.2% proof stress of as high as 1300 to 1700 MPa. Even when a high pressure is applied from the fluid within the piping 12, the diaphragm 6 is elastically deformed in a wide region without plastic deformation, so that the accurate pressure sensing performance can be maintained in a wide pressure range.

Unlike the precipitation-hardened alloy, the two-phase stainless steel can be uniformly polished with no possibility of predominant polishing of a portion thereof when the surface is polished smoothly into a mirror surface. Thus, the polishing can reliably provide the smooth surface such as the mirror surface. The readiness of the smooth surface is advantageous in providing the pressure sensor with high accuracy of pressure sensing since the strain gauge is precisely formed when the two-phase stainless steel forms the pressure-receiving portion 6A of the diaphragm 6 and the circuit such as the strain gauge is provided on the polished surface of the pressure-receiving portion 6A.

Since the two-phase stainless steel described above shows a transpassive potential of 1.2 V or higher in a phosphoric acid solution at a concentration of 0.2 mol/l, the predominant corrosion of the diaphragm 6 is not likely to occur when the cathodic protection is employed to apply the potential difference as shown in FIG. 2. As a result, the pressure sensor 10 including the diaphragm 6 with high corrosion resistance can be provided.

FIG. 3 shows an embodiment in which the diaphragm according to the present invention is applied to the diaphragm valve. The diaphragm valve 20 according to the embodiment includes a body 23 of flat plate shape having a first flow path 21 and a second flow path 22 formed therein, a diaphragm 26 placed on the body 23, and a lid member 25 holding the diaphragm 26 with the body 23. The body 23 has the first flow path 21 extending from one side face 23*a* of the body 23 to the central portion of an upper face 23*b* of the body 23 and the second flow path 22 extending from the other side face 23*c* of the body 23 to near the central portion of the upper face 23*b* of the boy 23. An inlet 27 is the portion at the one side face 23*a* of the body 23 where the first flow path 21 is opened, and an outlet 28 is the portion at the other side face 23*c* of the body 23 where the second flow path 22 is opened.

A peripheral stepped portion 28 is formed on the upper face of the body 23 closer to the center where the first flow path 21 extends, and a seat 29 is attached to the peripheral stepped portion 28. The diaphragm 26 is made of the two-phase stainless steel equivalent to the diaphragm 1 described above and is formed in a disk dome shape consisting of a dome portion 26A, a boundary portion 26B, and a collar portion 26C, similarly to the diaphragm 1.

The diaphragm 26 is sandwiched between the body 23 and the lid member 25 with the bulge of the dome portion 26A facing upward such that a pressure chamber 26*a* is provided between the diaphragm 26 and the upper face 23*b* of the body 23.

The lid member 25 has a through hole 25*a* formed at the center of its upper face for inserting a stem 24, and the stem 24 is placed in contact with the center of an upper face of the diaphragm 26.

In the diaphragm valve 20 structured as described above, the stem 24 can be lowered to deform and press the dome portion 26A of the diaphragm 26 downward as shown by a chain double-dashed line in FIG. 3 against the seat 29 to block the communication between the first flow path 21 and the second flow path 22. Alternatively, the stem 24 can be raised to separate the dome portion 26A of the diaphragm 26 from the seat 29 to allow the first flow path 21 to communicate with the second flow path 22.

The diaphragm valve 20 can be used as the valve which switches between the communication and the block of the first flow path and the second flow path in association with the upward and downward movements of the stem 24.

Since the diaphragm valve 20 thus structured includes the diaphragm 26 made of the two-phase stainless steel described above, the excellent diaphragm valve 20 can be advantageously provided by the diaphragm 26 with high strength and excellent corrosion resistance.

FIGS. 4A and 4B show an embodiment in which the diaphragm according to the present invention is applied to the pressure sensor. A pressure sensor 30 according to the present embodiment includes a diaphragm 36 having a thin pressure-receiving portion 36A made of the two-phase stainless steel described above on one end of a tubular portion 36B, and further includes four pressure-sensitive resistance films 32 on an upper surface of the pressure-receiving portion 36A with an insulating film 31 interposed therebetween and six wiring layers connected to these pressure-sensitive resistance films 32. Of the six wiring layers, each of two wiring layers 33 is connected to two pressure-sensitive resistance film 32 at one end thereof and has a terminal connecting layer 35 at the other end thereof. Each of the remaining four wiring layers 34 is connected to one pressure-sensitive resistance film 32 at one end thereof and has a terminal connecting layer 37 at the other end thereof. These terminal connecting layers 35 and 37 can be connected to a measurement device to form a bridge circuit including the four pressure-sensitive resistance films 32. The bridge circuit can be used to calculate the pressure applied to the pressure-receiving portion 36A based on the resistance change in the pressure-sensitive resistance films 32.

The pressure sensor 30 structured as described above includes the diaphragm 36 made of the two-phase stainless steel described above similarly to the pressure sensor 10 in the above embodiment, so that the pressure-receiving portion 36A has high strength and resistance to high pressure. The diaphragm 36 can have excellent corrosion resistance even when the cathode protection is employed in piping or the like. Consequently, the diaphragm valve 30 can be advantageously provided with high measurement accuracy and excellent corrosion resistance.

Although the embodiments have been described in conjunction with the example where the diaphragm made of the two-phase stainless steel is applied to each of the diaphragms having the specific structures shown in FIG. 1 to FIG. 4B, it goes without saying that the technology in the present invention is not applied only to the diaphragms of the structures shown in FIG. 1 to FIG. 4B, but is widely applicable to diaphragms of a variety of uses.

Since FIG. 1 to FIG. 4B show the diaphragms of the embodiments with appropriate changes in the scaling or the shape of the components for clear representation, the diaphragm according to the present invention is not limited to the shapes shown.

Example

For comparison of the materials forming the diaphragm, SPRON510 (registered trademark of Seiko Instruments Inc.) having a composition of Ni: 31% (mass %, this applies to the following) Cr: 19%, Mo: 10.1%, Nb: 1.5%, Fe: 2.1%, Ti: 0.8%, and balance: Co was prepared as an alloy of sample 1.

An alloy of JIS SUS316L was prepared as sample 2, and an alloy of JIS SUS329J4L was prepared as sample 3. SUS316L was an austenite based stainless steel having a composition rate of C: 0.08% or less, Si: 1.0% or less, Mn: 2.0% or less, P: 0.045% or less, S: 0.03% or less, Ni: 11%, Cr: 18%, and Mo: 2.5%, and was used as the alloy of sample 2. SUS329J4L was a two-phase stainless steel having a composition rate of C: 0.03% or less, Si: 1.0% or less, Mn: 1.5% or less, P: 0.04% or less, S: 0.03% or less, Ni: 6%, Cr: 25%, Mo: 3%, and N; 0.1%, and was used as the alloy of sample 3.

The alloy of sample 1 was subjected to homogenization heat treatment, holding at 1070° C. for two hours, and then furnace cooling. The alloy of sample 2 was subjected to homogenization heat treatment, holding at 1070° C., and then water cooling. The alloy of sample 3 was subjected to homogenization heat treatment, holding at 1080° C., and then water cooling, and was worked at a reduction of area described later through cold swaging as described later in detail.

The alloys of samples 1 to 3 were used to perform an anode polarization test in a phosphoric acid solution. The conditions of the polarization test were as follows:

Electrolytic solution: 0.2 mol/l of phosphoric acid solution at a concentration of 1%, 200 ml used in one measurement, Counter electrode: Pt, Reference electrode: reversible hydrogen electrode (RHE), Potentiostat/galvanostat: EG&G PRINCETON APPLIED RESEARCH model 263A, Deaeration: bubbling with $N_2$ gas for 15 minutes, and Test method: holding at −0.4 V (v.s RHE) for 15 seconds, sweeping at 0.333 mV/s to 2.0 V (v.s RHE).

The results of the anode polarization test described above are shown in FIG. 5.

Figure 5:
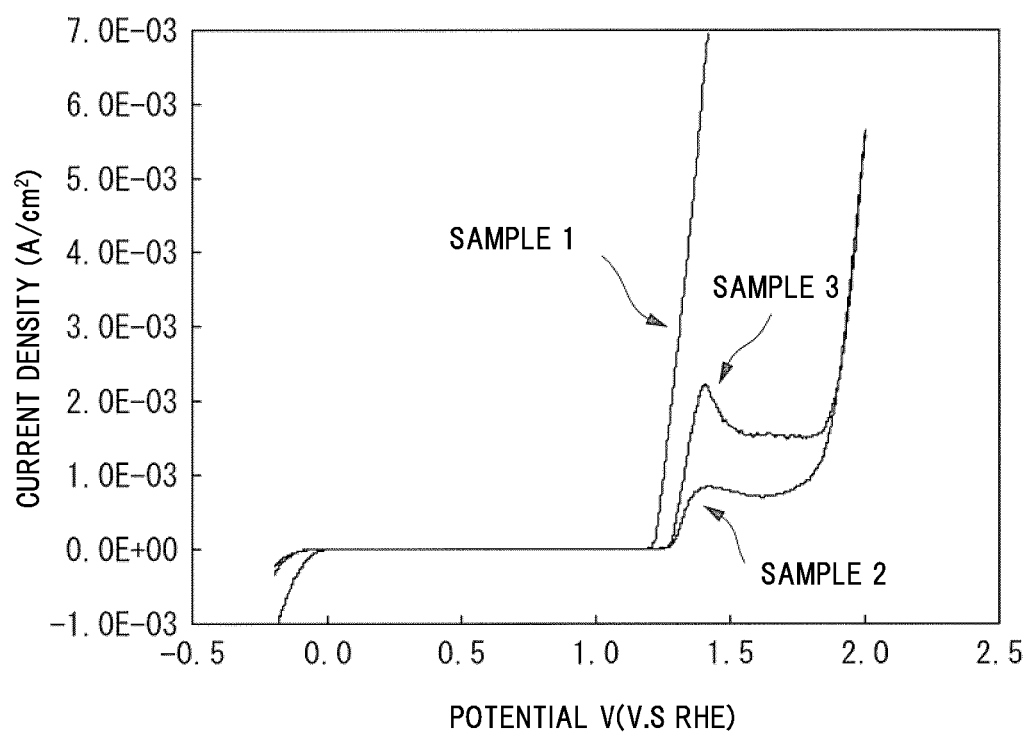
FIG. 5 is a graph showing the dependence of the corrosion potential of a sample of two-phase stainless steel and the corrosion potential of a sample of Co—Ni alloy on current density in a test where the two-phase stainless steel according to the present invention was anode-polarized.

The results of the anode polarization test at lower potentials in FIG. 5 show that the alloy of sample 1 in the phosphoric acid solution exhibits a higher corrosion potential (potential at a current density of 0 $mA/cm^2$) higher than those of the alloy of sample 2 and the alloy of sample 3. Thus, all the alloys of samples 1 to 3 have favorable corrosion resistance in a simple immersion state.

However, as the potential is increased, the alloy of sample 1 undergoes transpassive corrosion in which the current density is abruptly increased. The abrupt increase in the current density is due to the breaking of a dense passivation film on the electrode surface. The potential at this point is referred to as a transpassive potential. As the value is increased, the transpassive corrosion occurs less easily, and the passivation film contributing to corrosion resistance is maintained.

The transpassive potential of the alloy of sample 1 is lower than those of the alloy of sample 2 and the alloy of sample 3. Specifically, the alloy of sample 1 has excellent corrosion resistance at lower potentials, but transpassive corrosion readily occurs and corrosion significantly proceeds to general corrosion at higher potentials. The results shown in FIG. 5 indicate that the transpassive potential of the alloy of sample 1 is approximately 1.2 V (v.s RHE), whereas the transpassive potential of the alloy of sample 3 is higher than 1.2 V (v.s RHE) and approximately 1.4 V (v.s RHE). Although the current density of the alloy of sample 1 rises abruptly and linearly, the current density of the alloy of sample 3 is not monotonous, that is, it once rises, reaches a small peak at approximately 2.0 E-03, and then levels at approximately 1.9 V. This shows that the corrosion of the alloy of sample 3 does not proceed without stopping to the general corrosion but plateaus once and then resumes, so that the alloy of sample 3 can be regarded as apparently having more excellent corrosion resistance than that of the alloy of sample 1. The plateau after the small peak in the region means that an originally produced primary passivation film was corroded and broken and then a thicker secondary passivation film (Cr oxidization film) was produced from the changed Cr valance on the alloy surface. It can be estimated that the secondary passivation film was effective in providing the anti-corrosive function.

It can be considered from the results shown in FIG. 5 that the alloy of sample 3 made of the two-phase stainless steel has a higher corrosion resistance and undergoes the general corrosion less easily even at higher potential as compared with the alloy of sample 1.

Figure 6:
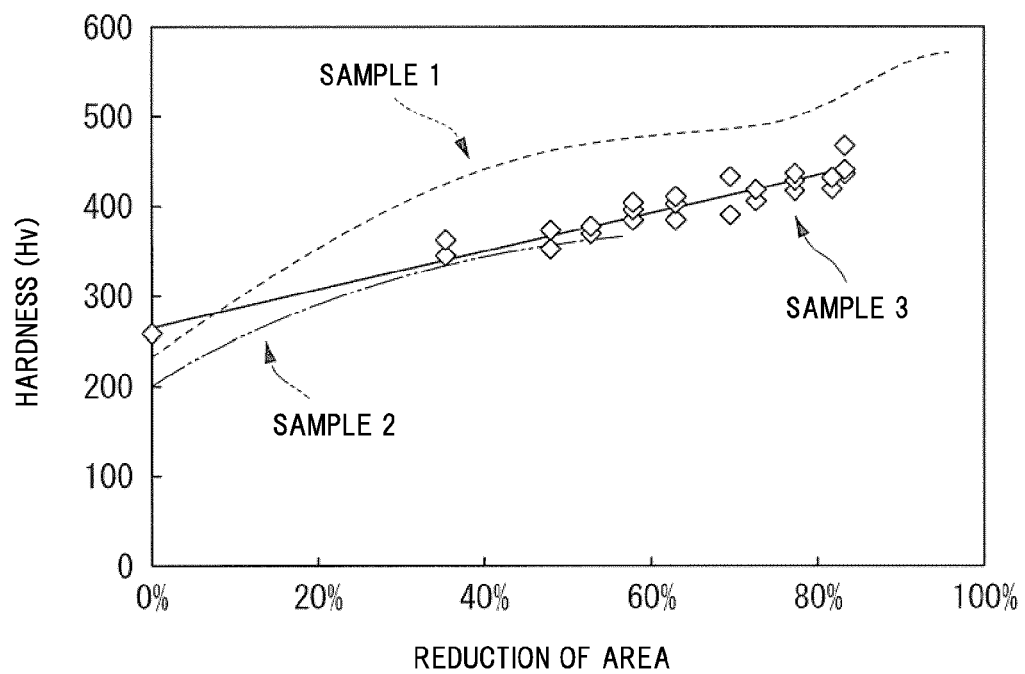
FIG. 6 is a graph showing an exemplary hardness state according to a reduction of area when the sample of two-phase stainless steel and the sample of Co—Ni alloy were swaged.

FIG. 6 is a graph showing changes in hardness (Hv) with the swaging of the alloys of samples 1, 2, and 3 (Vickers hardness test, load: 300 gf, test time: 15 seconds). As the swaging proceeds, all the alloys of samples 1, 2, and 3 are hardened. The hardnesses of the alloys of sample 1 and the alloy of sample 2 prepared for comparison are shown. The hardening of the alloy of sample 3 is not as high as the alloy of sample 1 but monotonously increases unlike the alloy of sample 2 which tends to saturate at a reduction of area of 60% or higher. The alloy of sample 1 shows approximately 500 Hv at a reduction of area of 80%, and the alloy of sample 3 shows approximately 400 Hv at a reduction of area of 80%.

Figure 7:
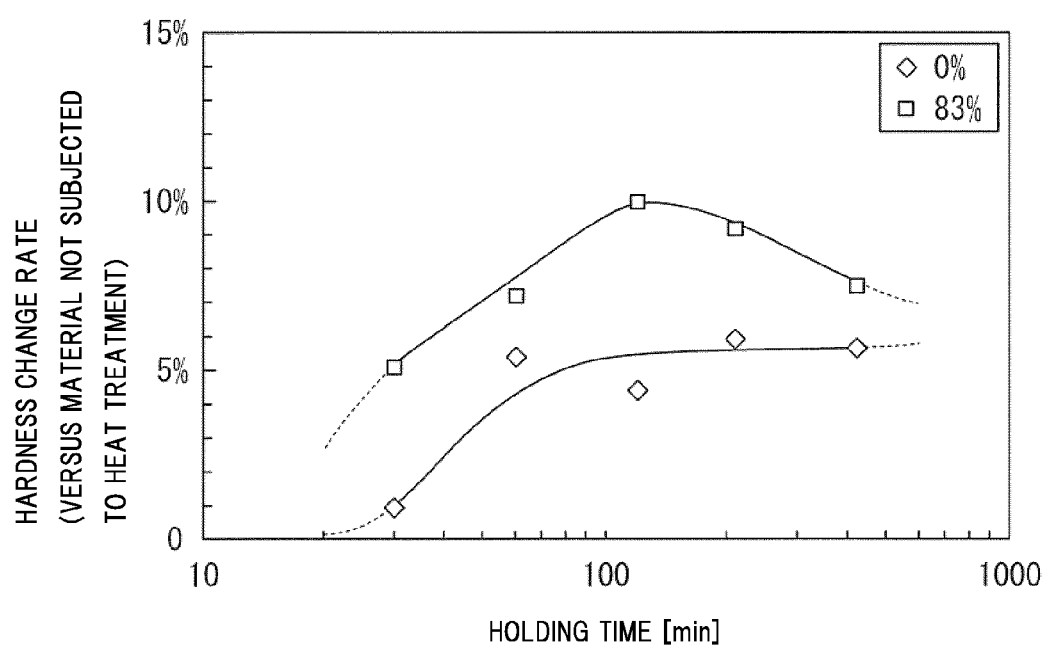
FIG. 7 is a graph showing the relationship between the holding time at 350° C. and the hard change rate in the sample swaged at a working rate of 83% and the sample not swaged in the two-phase stainless steel.

FIG. 7 shows the relationship between the aging time and the hardness change rate at 350° C. The age-hardening is significant in a sample having a reduction of area (working rate) of 83% shown by squares in the graph, and the increase rate reaches the highest at an aging time of 2 hours (120 minutes). It is assumed that stainless steel excluding the precipitation-hardened type, particularly two-phase stainless steel, is not age-hardened (disclosed in a number of literatures including "stainless steel handbook"). In the present example, however, the age-hardening phenomenon of the two-phase stainless steel, that is, the alloy of sample 3, was able to be found for the first time.

It is also obvious that the sample at a reduction of area (working rate) of 0% not subjected to working has a small hardness change rate.

Figure 8:
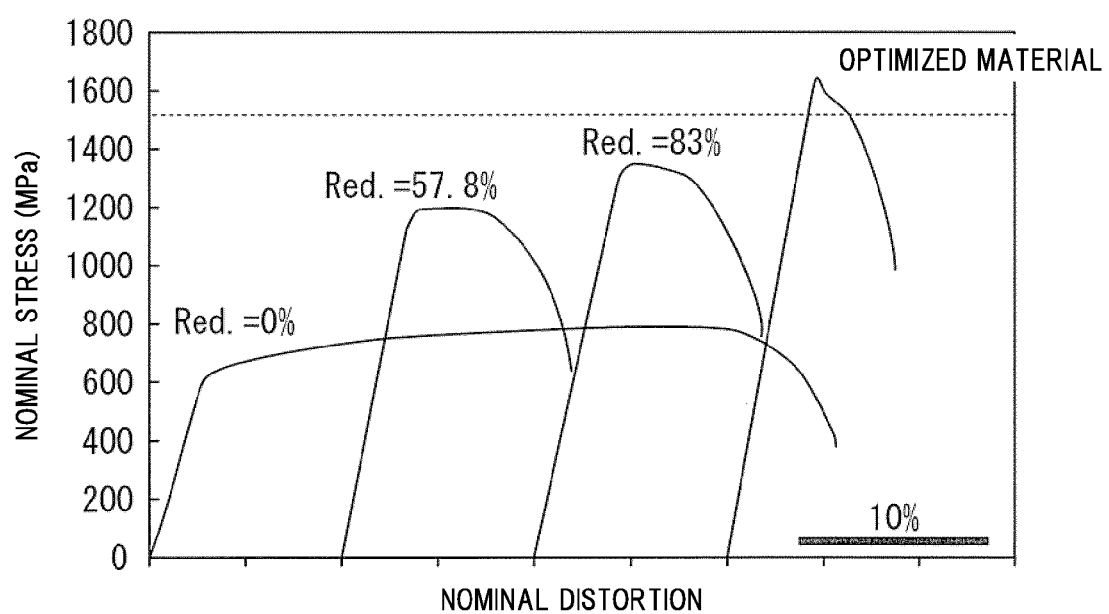
FIG. 8 is a graph showing the relationship between the stress and the distortion of the sample of two-phase stainless steel worked under optimized conditions.

FIG. 8 is a graph showing the relationship between stress and distortion provided from a tension test (distortion rate: $1.5 \times 10^{-4} S^{-1}$) of a sample alloy as an optimized material subjected to aging heat treatment under the optimized conditions described above (the reduction of area of 83%, 350° C., and the aging time of 2 hours). A dotted line in the graph indicates a proof stress of 1500 MPa of the boundary condition set as the highest target found by referencing a conventional material (SPRON510: registered trademark of Seiko Instruments Inc.) of a Co—Ni based alloy for diaphragm. A material as worked (sample without heat treatment) with Red.83% (reduction of area of 83%) does not reach 1500 MPz as the highest target even at the highest strength.

However, the aging heat treatment was performed under the optimized conditions to achieve a value sufficiently higher than 1500 MPa of the boundary as the highest target. After the optimization (the reduction of are of 83%, 350° C., and the aging time of 2 hours), a 0.2% proof stress was 1640 MPa.

It becomes apparent from the test results shown in FIG. 8 that a sample alloy not worked at a reduction of area of 0% and sample alloys swaged at reductions of area of 57.8% and 83% and not subjected to the aging heat treatment exhibit a brittle fracture in which a fracture occurs immediately after the completion of elastic deformation, whereas the sample swaged at a reduction of area of 83% and subjected to the aging heat treatment showed a proof stress of more than 1600 MPa. The alloy sample swaged at a reduction of area of 83% and subjected to the aging heat treatment is described later since it has a high proof stress and is not brittle characteristically.

Figure 9A:
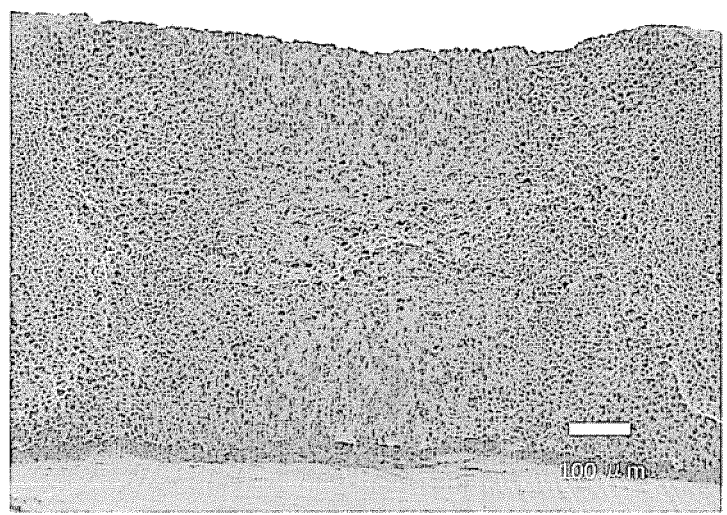
Figure 9B:
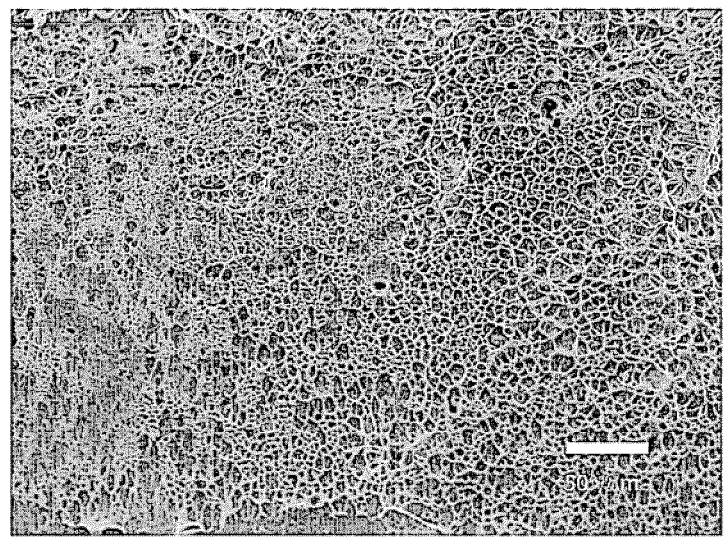

FIGS. 9A and 9B show images of the metal structures representing the fracture surface of the sample subjected to the aging heat treatment under the optimized conditions shown in FIG. 8. An SEM (scanning electron microscope) photograph of FIG. 9A shows the overall tensile fracture surface of the optimized material, and an SEM photograph of FIG. 9B shows an enlarged part of a central portion of the tensile fracture surface.

As shown in FIGS. 9A and 9B, a number of voids and a smooth fracture surface were observed on the tensile fracture surface. Since the sample subjected to the aging heat treatment under the above optimized conditions has the increased hardness, a cleavage fracture may be produced in particles less deformed plastically. The presence of dimples can be found on the fracture surface in the photographs of the metal structure, the presence of dimples on the fracture surface means a ductile fracture. In addition, since the presence of a smooth surface can be found besides the dimples in the photograph representing the enlarged central portion of the fracture surface shown in FIG. 9B, a transgranular fracture is also present. The coexistence of the dimples and the smooth surface on the fracture surface represents that the different fracture forms coexist, meaning the fracture surface with high proof stress but ductility and no brittle fracture.

Figure 10:
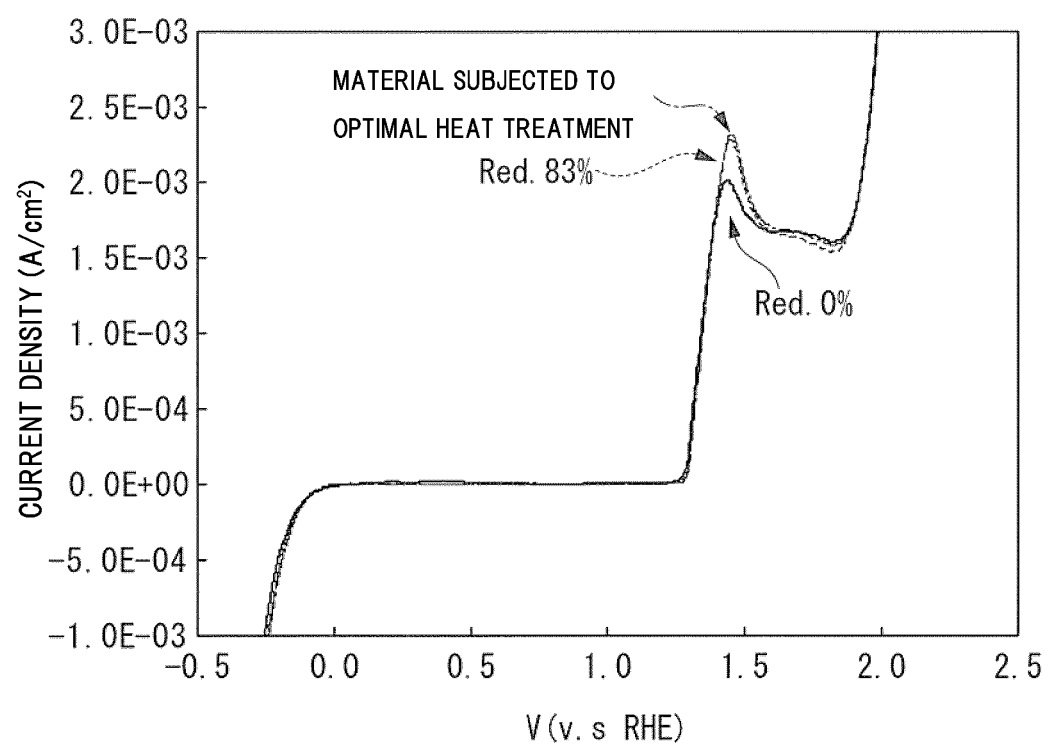
FIG. 10 is a graph showing the results of an anode polarization test of samples in Example.

FIG. 10 shows an anode polarization curve of an unworked material (Red.0%) of the alloy of sample 3 made of the two-phase stainless steel, an anode polarization curve of a 83%-worked material (Red.83%) of the alloy of sample 3, and an anode polarization curve of the alloy of sample 3 subjected to the optimal heat treatment (optimal heat treatment material). Regardless of the working histories, no large differences are observed in the corrosion potential at lower potential and the passivation region. Specifically, all the samples exhibit substantially the same degree of corrosion at lower potentials from the immersion in the phosphoric acid solution regardless of the presence or absence of the working.

On the other hand, at higher potentials, the worked materials showed no difference in the transpassive potential from the unworked material, but the transpassive current density was increased by the working. This may be because the working introduced high-density dislocation into the material. More attention should be paid to the fact that no reduction in corrosion resistance after the heat treatment was observed as reported in a number of types of stainless steel. This may be because the alloy of sample 3 has almost no carbon added thereto which would affect the corrosion resistance, and carbonized Cr is not formed and the deficiency of Cr is not caused near the grain boundary.

Figure 11:
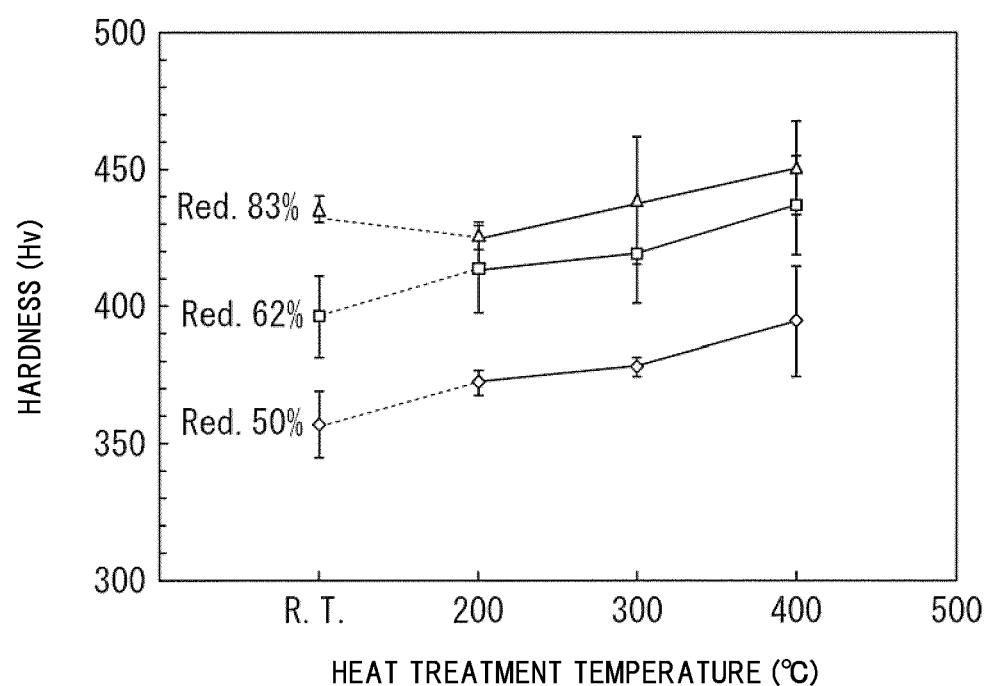
FIG. 11 is a graph showing the Vickers hardness when each sample worked at a different reduction of area was subjected to aging heat treatment at a temperature of 200 to 400° C.

FIG. 11 shows the Vickers hardness (Hy) of the alloy of sample 3 subjected to the working at reductions of areas (50%, 62%, and 83%) and then the aging heat treatment of 200 to 400° C. (Vickers hardness test, load: 300 gf, test time: 15 sec). For reference, the hardness before the heat treatment is plotted as R.T. (room temperature) on the horizontal axis. It can be seen that the hardness was increased at all the reductions of area in the alloy of sample as the heat treatment temperature is increased.

Table 1 below shows the tensile characteristics of the alloy of sample 3 subjected to the cold swaging at reductions of area of 57.8% and 83% and then the aging heat treatment at temperatures of 350° C., 500° C., and 650° C. Table 1 also shows the values of the heat treatment temperature, holding time (h), 0.2 proof stress (Mpa), tensile strength (MPa), and fracture elongation (%) in each swaging.

TABLE 1

| Reduction of Area (%) | Heat Treatment Temperature (° C.) | Holding Time (h) | 0.2% Proof Stress (Mpa) | Tensile Strength (Mpa) | Fracture Elongation (%) |
|---|---|---|---|---|---|
| 57.8 | 350 | 0.5 | 1288 | 1287 | 9.0 |
|  | 500 | 5 | 1340 | 1347 | 10.0 |
|  | 650 | 2.5 | 1409 | 1410 | 0.0 |
| 83 | 350 | 5 | 1584 | 1614 | 7.0 |
|  | 500 | 2.5 | 1699 | 1699 | 6.0 |
|  | 650 | 0.5 | 1584 | 1584 | 0.0 |

From the results shown in Table 1, the sample at the reduction of area of 57.8% had a proof stress of 1400 MPa or higher when the aging heat treatment was performed at 650° C. for 2.5 hours. However, this sample exhibits a brittle fracture in which a fracture occurs immediately after the completion of elastic deformation. The sample at the reduction of area of 83% had a proof stress of 1500 MPa or higher even at a temperature of 350° C. and a fracture elongation of 7.0%.

In view of the test results shown in FIG. 7 and FIG. 8 and the test results shown in FIG. 11 and Table 1 described above, the diaphragm having a required proof stress of 1300 MPa or higher, involving no brittle fracture in which a fracture occurs immediately after the completion of elastic deformation in the tension test, and having a fracture elongation of 6% or higher may need the plastic working at a reduction of area of 60% or higher and the aging heat treatment at 350 to 500° C.

In view of the test results shown in FIG. 7 and FIG. 8 and the test results shown in FIG. 11 and Table 1 described above, the diaphragm having a high proof stress of 1500 MPa or higher over the conventional material, involving no brittle fracture in which a fracture occurs immediately after the completion of elastic deformation in the tension test, and having a fracture elongation of 6% or higher may need the plastic working at a reduction of area of 83% or higher and the aging heat treatment at 350 to 500° C.

It is shown from the results in FIG. 11 and Table 1 that, as the reduction of area (working rate) is increased from a reduction of area of 50%, the target mechanical characteristics are achieved. When only the die diameter is considered, the swaging can provided working at 99.6% in terms of reduction of area from the start. Since this is smaller than the dimensions of the pressure sensor product, a reduction of area of approximately 90% is considered as a practical limit. Thus, a reduction of area practically determined for the product can be selected in a range of 50% to 90%. It goes without saying that a range of 60 to 90% is preferred in order to provide a higher target in the mechanical characteristics, for example, a proof stress of 1400 MPa or higher, and a range of 83 to 90% is preferred in order to provide a proof stress of 1600 MPa or higher.

Although the time for the aging heat treatment can be selected from 0.5 to 5 hours as shown in Table 1, the time may be selected in a range of 0.2 to 10 hours in view of the relationship between the holding time and the hardness change rate shown in FIG. 7. Considering the production efficiency together with an increased hardness, the time is selected preferably in a range of 0.5 to 5 hours shown in Table 1.

Figure 12:
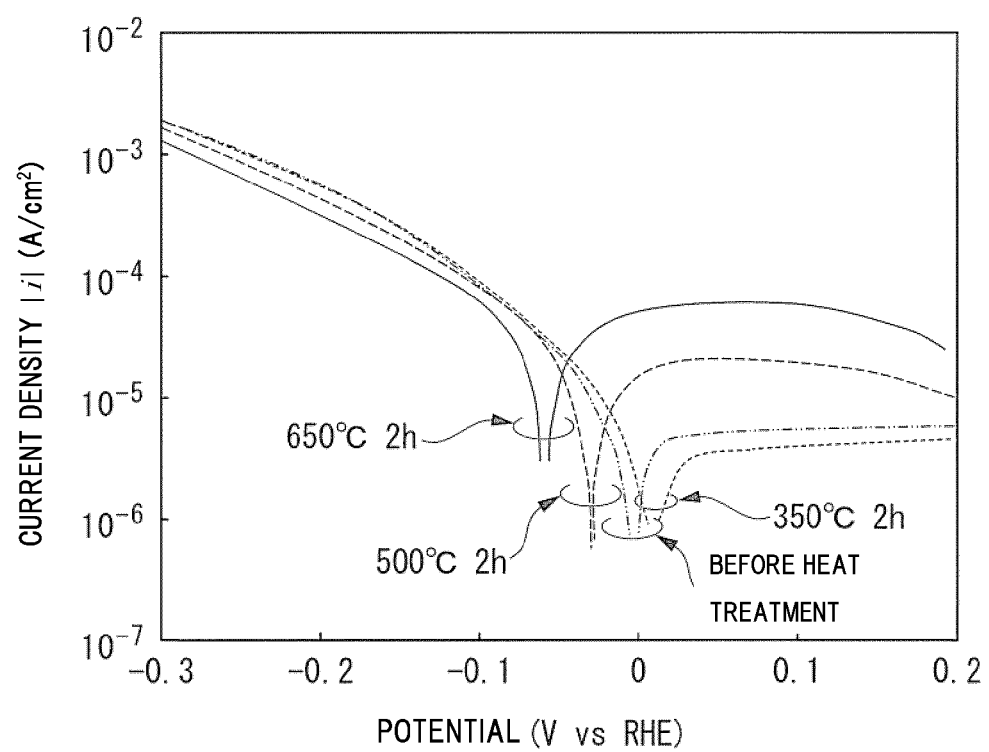
FIG. 12 is a graph showing a Tafel plot before and after the heat treatment of each sample.

FIG. 12 is a Tafel plot of the alloy of sample 3 before and after the heat treatment.

No large difference is seen between the sample before the heat treatment and the alloy subjected to the heat treatment at 350° C., but at a heat treatment temperature of 500° C. or higher, the corrosion potential is reduced and the corrosion current density is increased. In other words, it is shown that the heat treatment has a significant influence on the corrosion resistance at a treatment temperature of 500° C. or higher. Thus, when the pressure sensor including the diaphragm according to the present invention is used in a system in which the cathodic protection is used for piping or the like where a phosphoric acid based, non-oxidizing acid cleaner is used, the two-phase stainless steel should be subjected to the aging heat treatment at a heat treatment temperature of 500° C. or lower, more preferably in a range of 350 to 500° C., in order to provide excellent corrosion resistance even when the diaphragm is polarized toward the anode.

Figure 13:
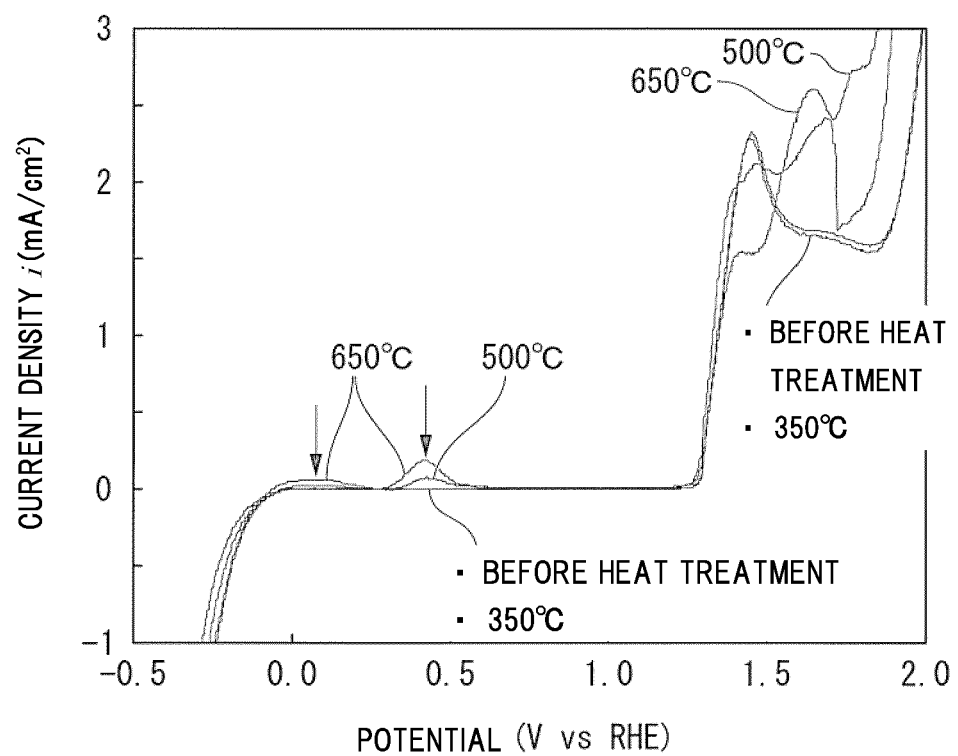
FIG. 13 is a graph showing the anode polarization curves of the samples before and after the heat treatment.

FIG. 13 shows an anode polarization curve of the alloy of sample 3 before and after the heat treatment.

The anode polarization test can offer the information about the formation of a passivation film. Since the material before the heat treatment and the material subjected to the heat treatment at 350° C. have substantially the same anode polarization curves, it can be seen that both materials have no difference in the formation of the passivation film. However, when the heat treatment is performed at 500° C. and 650° C., an active region is produced near 0 V, and peaks of current density were observed near 0.5 V. The increased current density suggests the dissolution of metal elements due to oxidation, meaning that the heat treatment at 500° C. or higher influences the formation of the passivation film. This shows that the heat treatment at 500° C. or higher on the alloy of sample 3 produces the passivation film, but the film is not so effective as providing corrosion resistance.

What is claimed is:

1. A diaphragm comprising a two-phase stainless steel consisting of 24 to 26 mass % Cr, 2.5 to 3.5 mass % Mo, 5.5 to 7.5 mass % Ni, 0.03 mass or less C, 0.08 to 0.3 mass % N, 1.0 mass % Si, 1.5 mass % or less Mn, 0.04 mass % or less P, and the balance Fe and inevitable impurities, wherein the steel is subjected to plastic working at a reduction of area of 50% or higher to form a diaphragm and then subjected to aging heat treatment at a temperature from 350° to 500° C., such that the diaphragm has a 0.2% proof stress of 1300 MPa or higher, a fracture elongation of 6% or higher, wherein a surface of the diaphragm is polished smooth and the diaphragm has a transpassive potential in a phosphoric acid solution at a concentration of 0.2 mol/l that is 1.2 (vs. RHE) or higher.

2. The diaphragm according to claim 1, wherein the two-phase stainless steel is subjected to plastic working at a reduction of area of 83% or higher, then subjected to the aging heat treatment such that the diaphragm has a 0.2% proof stress of 1500 MPa or higher.

3. A pressure sensor comprising the diaphragm according to claim 1.

4. A diaphragm valve comprising the diaphragm according to claim 1.

5. A method of manufacturing a diaphragm comprising providing a two-phase stainless steel, performing working at a reduction of area of 50% or higher on the two-phase stainless steel to form a diaphragm, wherein the stainless steel consists of 24 to 26 mass % Cr, 2.5 to 3.5 mass % Mo, 5.5 to 7.5 mass % Ni, 0.03 mass % or less C, 0.08 to 0.3 mass % N, 1.0 mass % Si, 1.5 mass % or less Mn, 0.04 mass % or less P, and the balance Fe and inevitable impurities, performing aging heat treatment at a temperature from 350° to 500° C. such that the diaphragm has a 0.2% proof stress of 1300 MPa or higher and a fracture elongation of 6% or higher and polishing a surface of the diaphragm to provide a smooth surface, wherein the diaphragm has a transpassive potential in a phosphoric acid solution at a concentration of 0.2 mol/l that is 1.2 (vs. RHE) or higher.

6. The method of claim 5 comprising performing working at a reduction of area of 83% or higher such that the diaphragm has a 0.2% proof stress of 1500 MPa or higher.

7. The diaphragm of claim 1, wherein the diaphragm has a Vickers hardness of at least 300.

\* \* \* \* \*

UNITED STATES PATENT AND TRADEMARK OFFICE
CERTIFICATE OF CORRECTION

| | | |
|---|---|---|
| PATENT NO. | : 9,523,620 B2 | |
| APPLICATION NO. | : 14/162247 | |
| DATED | : December 20, 2016 | |
| INVENTOR(S) | : Takuma Otomo et al. | |

It is certified that error appears in the above-identified patent and that said Letters Patent is hereby corrected as shown below:

In the Claims

In Column 14, Claim 1, Line 45, after "Ni, 0.03 mass" insert --%--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*